(12) United States Patent
Klein

(10) Patent No.: US 11,512,464 B2
(45) Date of Patent: Nov. 29, 2022

(54) ROBUST MULTI-LAYER BUILDING CONSTRUCTION TAPE AND RELATED FRAMING MEMBERS

(71) Applicant: James Alan Klein, Bellevue, WA (US)

(72) Inventor: James Alan Klein, Bellevue, WA (US)

( * ) Notice: Subject to any disclaimer, the term of this patent is extended or adjusted under 35 U.S.C. 154(b) by 96 days.

(21) Appl. No.: 17/100,735

(22) Filed: Nov. 20, 2020

(65) Prior Publication Data

US 2021/0148112 A1 May 20, 2021

Related U.S. Application Data

(63) Continuation-in-part of application No. 16/853,281, filed on Apr. 20, 2020, which is a continuation of application No. 16/020,647, filed on Jun. 27, 2018, now Pat. No. 10,626,598, said application No. 17/100,735 is a continuation-in-part of application No. 15/675,332, filed on Aug. 11, 2017.

(60) Provisional application No. 62/602,687, filed on May 3, 2017, provisional application No. 62/602,685, filed (Continued)

(51) Int. Cl.
*E04B 1/76* (2006.01)
*E04B 2/74* (2006.01)
*B32B 9/04* (2006.01)
*B32B 27/06* (2006.01)
*E04B 1/94* (2006.01)

(52) U.S. Cl.
CPC .............. *E04B 1/76* (2013.01); *B32B 9/046* (2013.01); *B32B 27/065* (2013.01); *E04B 2/7411* (2013.01); *E04B 1/948* (2013.01); *E04F 2290/045* (2013.01)

(58) Field of Classification Search
None
See application file for complete search history.

(56) References Cited

U.S. PATENT DOCUMENTS 5,502,937 A * 4/1996 Wilson .................. B32B 15/20
52/273
6,226,946 B1 * 5/2001 Stough ...................... C09J 7/21
52/460

(Continued)

*Primary Examiner* — Chinessa T. Golden
(74) *Attorney, Agent, or Firm* — Thomas E. Loop

(57) ABSTRACT

Robust multi-purpose, multi-layer, building construction tapes and building construction framing members and related wall assemblies are disclosed that comprise a sheet metal framing member (all profiles) in combination with a new and more robust type of multi-layer building construction tape for fire safety and sound reduction. The multi-layer building construction tape comprises a flexible thermal barrier layer attached to (1) a flexible intumescent material layer having a lesser width (thereby enabling flex-lock rollover) and/or (2) a resilient unfoamed cross-linked polyethylene layer. In combination, the thermal barrier layer is on a surface of the sheet metal framing member, whereas the thermal barrier layer is attached to the intumescent layer or polyethylene layer (as the case may be) such that the thermal barrier layer is between the sheet metal framing member and the intumescent layer or the polyethylene layer. The multi-layer building construction tapes disclosed herein slow and impede the spread of fire and smoke (during a fire) and also reduces sound transmission between adjacent rooms in a building.

8 Claims, 8 Drawing Sheets

Related U.S. Application Data on May 3, 2017, provisional application No. 62/601,747, filed on Mar. 31, 2017.

(56) References Cited

U.S. PATENT DOCUMENTS

| | | | |
|---|---|---|---|
| 2003/0079425 A1* | 5/2003 | Morgan | E04B 2/82 52/232 |
| 2011/0011019 A1* | 1/2011 | Stahl, Jr. | E04B 2/7411 52/309.1 |
| 2013/0118102 A1* | 5/2013 | Pilz | E04B 1/948 52/232 |

* cited by examiner

ROBUST MULTI-LAYER BUILDING CONSTRUCTION TAPE AND RELATED FRAMING MEMBERS

CROSS-REFERENCE TO RELATED APPLICATIONS

This application is a continuation-in-part of U.S. application Ser. No. 16/853,281 filed on Apr. 20, 2020 (pending), which application is a continuation of U.S. application Ser. No. 16/020,647 filed on Jun. 27, 2018 (now U.S. Pat. No. 10,626,598), which application is a continuation-in-part of U.S. application Ser. No. 15/675,332 filed on Aug. 11, 2017 (pending), which application claims the benefit of U.S. Provisional Application No. 62/601,747 filed on Mar. 31, 2017, U.S. Provisional Application No. 62/602,687 filed on May 3, 2017, and U.S. Provisional Application No. 62/602,685 filed on May 3, 2017. These priority applications are incorporated herein by reference in their entireties for all purposes.

TECHNICAL FIELD

The present invention relates generally to building construction fire blocking systems and, more particularly, to fire, smoke and sound blocking systems and related methods used to seal linear construction joints (for purposes of impeding the transmission of fire and smoke in the event of a building fire and/or the transmission of sound). The present invention is directed to various building construction framing members made of sheet metal (all profiles) in combination with a new, more robust, type of multi-layer fire safety and/or general-purpose building tape, as well as to related fire rated wall assemblies.

BACKGROUND OF THE INVENTION

In the building construction industry, a head-of-wall joint (also sometimes referred to as a top-of-wall joint) refers to the linear junction or interface existing between a top section of a wall assembly and the ceiling (where the ceiling may be a next-level flat concrete floor or a corrugated pan roof deck, for example). Similarly, an expansion joint refers to the linear junction existing between adjacent wall (or ceiling) sections (such as adjacent pieces of wallboard, for example). The proper sealing of linear junctions, including head-of-wall joints and expansion joints, during the building construction phase is critically important to prevent or reduce the spread of fire and smoke in the event of a building fire.

As appreciated by contractors in the building construction industry, there are two primary methods used for sealing linear junctions (e.g., head-of-wall joints and expansion joints) against the spread of fire and smoke; namely, (1) the application of a firestop intumescent sealant (in the form of either a caulk or spray) along and into the linear joint, or (2) the installation of specialty tracks and/or other suitable framing members that have a pre-applied intumescent tape appropriately placed on (i.e., in physical contact with) the track or other suitable framing member such that the intumescent tape seals the linear construction joint. These two known methods have both been tested and approved by Underwriter Laboratories, Inc. (("UL"—an independent worldwide testing and regulatory compliance certification organization) as being compliant with certain specified fire and hose stream test standards presently in existence.

More specifically, UL has tested and certified various building construction "joint systems" in accordance with their testing standards as set forth in, for example, document "UL 2079 Tests for Fire Resistance of Building Joint Systems, fifth edition (Aug. 26, 2015)." These UL fire tests described here are applicable to building construction joint systems (assemblies) of various materials and construction (intended for use at linear junctions between adjacent fire resistive structures). UL's joint system fire tests are intended to evaluate the length of time that a specified joint system will contain a fire during a predetermined test exposure. UL's joint system fire tests evaluate the joint system's resistance to heat and, in some instances, to a hose stream, while carrying an applied load (if the assembly is load bearing). UL's joint system fire tests may, in some instances, include an air leakage test to determine the rate of air leakage through joint systems resulting from a specified air pressure difference applied across the surface of the joint system.

For example, and under current UL's requirements, a joint system may be subjected to a controlled fire exposure that achieves specified temperatures throughout a specified period. Some joint systems are cycled through their intended range of movement prior to fire exposure (to demonstrate that the joint system's range of movement and the impact of the joint system during movement on the adjacent fire resistive structures). Joint systems are often required to be loaded to their designed live load capacity during the fire test. For tests involving wall-to-wall and head-of-wall joint systems, the fire test is typically followed by a hose stream test. UL's joint system fire tests and related requirements are intended to provide a relative measure of fire performance of comparable assemblies under specified fire exposure conditions. Similarly, the Sound Transmission Class (or "STC") is an integer rating of how well a building partition attenuates sound (airborne) that is widely used in the U.S. to rate interior partitions, ceilings, floors, doors, windows and exterior wall configurations. The STC rating is useful for evaluation annoyances due to speech sound, but not music or machinery noise as these sources contain more low frequency energy than speech. A higher STC number indicates a more effective sound insulation than a lower number.

In the building construction industry, metal framing assemblies are commonly used to construct commercial and residential buildings. Metal framing assemblies are generally constructed from a plurality of metal framing members including studs, joists, trusses, and other metal posts and beams formed from sheet metal (and frequently fabricated to have the same general cross-sectional dimensions as standard wood members used for similar purposes). Metal framing members are typically constructed by either brake-pressing or roll-forming (with both methods being referred to as "cold-formed" processes) 12 to 24 gauge galvanized sheet steel. Although many cross-sectional shapes are available, the primary shapes used in building construction are C-shaped studs and U-shaped tracks. For example, most wall assemblies are made from opposing cold-formed slotted U-shaped tracks fastened to the floor and ceiling, and a plurality of a cold-formed C-shaped studs laterally spaced apart and positioned between the opposing tracks. Head-of-wall linear joints associated with these types of joint systems are of especially importance in terms of sealing against the spread of fire and smoke.

Although some progress has been made in recent years, there is still a need in the art for new and improved fire, sound and smoke blocking sealant systems and methods including innovative building construction specialty products that better seal linear construction joints (for purposes of impeding the transmission of fire and smoke in the event of a building fire, and/or impending the transmission of sound from one room to another). The present invention fulfills these needs and provides for further related advantages.

SUMMARY OF THE INVENTION

In brief, the present invention is directed to a more robust multi-purpose, multi-layer building construction tape, as well as various building construction framing members (all profiles) in combination with the multi-layer building construction tape that better and more economically seals linear construction joints (against the transmission of fire, smoke, and/or sound). In one embodiment, the multi-layer tape is preferably composed of, in series, a flexible backing/release layer; a thermal barrier layer; a first adhesive interface layer between the backing/release layer and the thermal barrier layer; a flexible intumescent material layer; a second adhesive interface layer between the intumescent material layer and the thermal barrier layer; and a flexible outer protective layer (wherein the outer protective layer is a tough, resilient layer that is composed of a polypropylene and/or polyethylene polymer (preferably foamed) that, in turn, may also include a further flexible outer protective layer thereon). As disclosed herein, the multi-layer building construction tapes of the present invention may take the form of a flexible and resilient multi-layered flat strip or may be in the form of a multi-layered roll (and thus may be unwound and applied to linear building construction joints in the field as needed or on tracks/framing members at the factory).

In other embodiments, the present invention is directed to a multi-layer building construction tape comprising a flexible polymer foam (closed or open cell) layer adjoined to a flexible intumescent material layer. In still further embodiments, the multi-layer fire safety tape may comprise a flexible hydrated mineral material such as, for example, a vermiculite coated fiberglass tape adjoined to a flexible intumescent material layer. In still further embodiments, a more robust multi-purpose (fire, smoke and/or sound) building construction tape.

In still other further embodiments, the present invention is directed to header tracks (generally U-shaped sheet metal header tracks, for example) and other framing members (control joint backers and L-shaped members, for example) having the inventive multi-layer fire safety and/or building construction tape applied thereto or thereon, as well as to fire and/or sound rated wall assemblies that include one or more such framing members.

These and other aspects of the present invention will become more evident upon reference to the following detailed description and attached drawings. It is to be understood, however, that various changes, alterations, and substitutions may be made to the specific embodiments disclosed herein and still be within the scope of the present invention.

BRIEF DESCRIPTION OF THE DRAWINGS

The drawings are intended to be illustrative and symbolic representations of certain exemplary embodiments of the present invention (and as such they are not necessarily drawn to scale). In addition, it is to be expressly understood that the relative dimensions and distances depicted in the drawings (and described in the "Detailed Description of the Invention" section) are exemplary and may be varied in numerous ways without departing from the scope of the invention (as defined by the claims). Finally, like reference numerals have been used to designate like features throughout the several views of the drawings.

DETAILED DESCRIPTION OF THE INVENTION

Figure 1A:
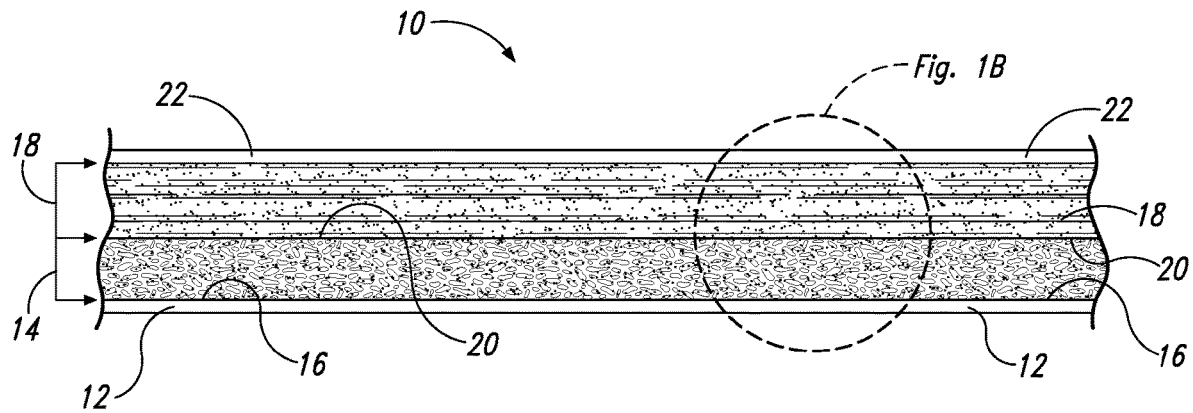
FIG. 1A is an enlarged side view of a flat piece of a multi-layer fire safety tape in accordance with an embodiment of the present invention; it shows a foam/intumescent material layered structure associated with the inventive multi-layer fire safety tape.

In the following detailed description, reference is made to the accompanying drawings, which form a part hereof. In the drawings, similar symbols or markings have been used to identify like or corresponding elements, unless context dictates otherwise. The illustrative embodiments described in the detailed description, drawings, and claims are not meant to be limiting. Other embodiments may be utilized, and other changes may be made, without departing from the spirit or scope of the invention disclosed herein.

Figure 1B:
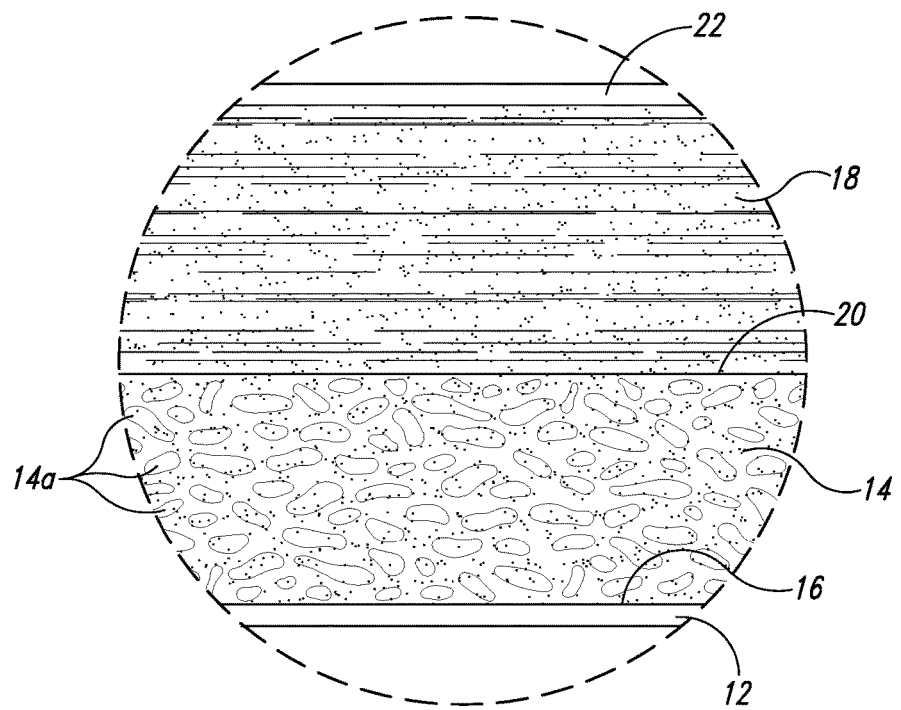
FIG. 1B is a further enlarged view of a portion of the multi-layer fire safety tape shown in FIG. 1A; it better shows various physical features (closed-cells or bubbles, for example) associated with one of the different distinct layers.
Figure 2A:
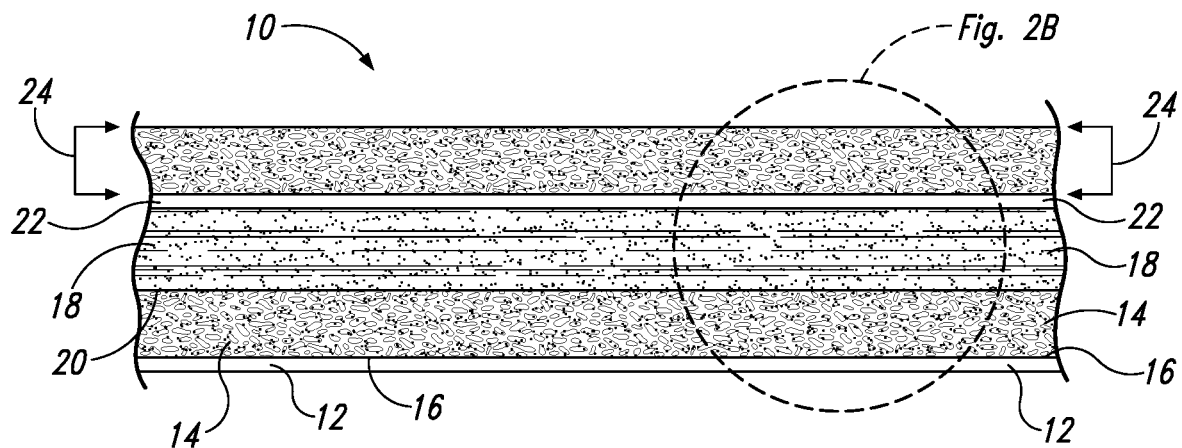
FIG. 2A is an enlarged side view of a flat piece of a multi-layer fire safety tape in accordance with another embodiment of the present invention; it shows a foam/intumescent material/foam layered structure associated with the inventive multi-layer fire safety tape.
Figure 2B:
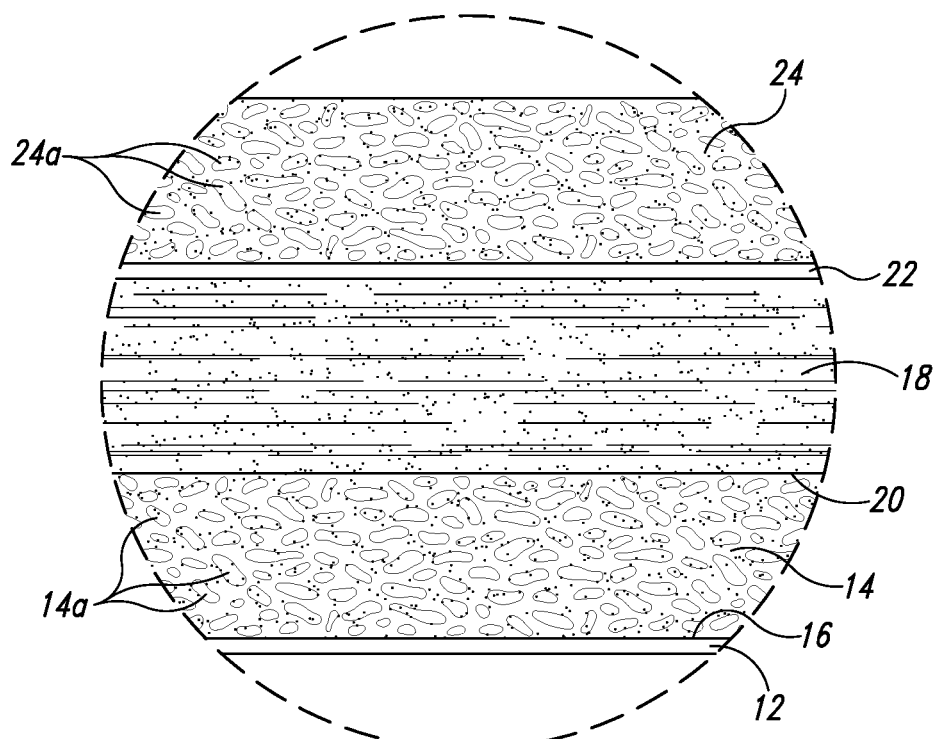
FIG. 2B is a further enlarged view of a portion of the multi-layer fire safety tape shown in FIG. 2A; it better shows various physical features (closed-cells or bubbles, for example) associated with two of the different distinct layers.

Accordingly, and as best shown in FIGS. 1A-B, the present invention in an embodiment is directed to a multi-layer fire safety tape 10 made of, in series (i.e., a "sandwich" of materials), (1) a flexible backing/release layer 12; (2) a flexible thermal barrier layer 14; (3) a first adhesive interface layer 16 between the backing/release layer 12 and the closed-cell polymer foam thermal barrier layer 14; (4) a flexible intumescent material layer 18; (5) a second adhesive interface layer 20 between the intumescent material layer 18 and the thermal barrier layer 14; and (6) a flexible outer protective layer 22. The thermal barrier layer 14 is preferably made of a thermoplastic material and takes the form of a flexible closed cell polymer foam.

The multi-layer fire safety tapes 10 of the present invention may take the form of a multi-layered flat strip (as shown in FIG. 1A-2B,), or may be in the form of a multi-layered roll; and, therefore, may be unwound and applied to or on appropriate building construction joints (not shown) in the field as needed, or may be factory pre-applied to or on tracks (or other framing member) intended for use in wall assemblies.

The flexible backing/release layer 12 is preferably a wax coated release paper (and thus may be easily separated from the flexible closed-cell polymer foam thermal barrier layer 14). In practice, the flexible backing/release layer 12 is manually removed from the multi-layer fire safety tape 10 just prior to the tape's use (application) in either the field (to seal linear construction joints) or at the steel track manufacturing factory (to appropriately position onto tracks and/or other framing members). By removing the flexible backing/release layer 12, the underlying first adhesive interface layer 16 is exposed thereby allowing contact and subsequent adhesion of the flexible closed-cell polymer foam thermal barrier layer 14 directly onto a targeted substrate (e.g., the downwardly extending flanges of a U-shaped track). The first adhesive interface layer 16 is preferably an acrylic based pressure sensitive adhesive; however, other adhesives such as polyurethane-based adhesives would also work and are within the scope of the present invention.

The closed-cell polymer foam thermal barrier layer 14 is preferably, but not necessarily, a foamed polyolefin (thermoplastic) having a plurality of internal and uniformly dispersed "closed cells" 14a with diameters ranging from about 100 to about 1,000 microns. A closed-cell foam is one where distinct bubbles of gas are trapped individually within the plastic. The foamed polyolefin is preferably a high-density semi-crystalline polyethylene material that has been foamed to a density of about 0.35 g/cm³; it may, however, comprise other polymers such as, for example, polypropylene, polyurathane, and/or polystyrene. The closed-cell polymer foam thermal barrier layer 14 preferably has a thickness ranging from about 0.2 to about 2.5 millimeters, and more preferably about 1.6 millimeters.

The closed-cell polymer foam thermal barrier layer 14 is in some preferred embodiments a foamed thermoplastic material and takes the form of a strip. In these preferred embodiments, the foamed thermoplastic material strip substantially enhances the overall compressibility and durability of the multi-layer fire safety tape 10. For example, and in these preferred embodiments, the foamed thermoplastic thermal barrier layer 14 also provides for superior resistance to damage or tearing of the otherwise fragile intumescent material layer 18 (a significant problem with current stand-alone self-adhering intumescent tapes), and substantial reductions in sound transmissions (from one room to the next in a building) as compared to the intumescent material layer 18 standing alone.

The intumescent material layer 18 is composed of an expandable graphite and preferably has a density of about 1.40 g/cm³. The intumescent material layer 18 preferably has a thickness ranging from about 1.0 to about 2.5 millimeters, and more preferably about 1.8 millimeters. In all embodiments, the intumescent material layer 18 does not contact the targeted substrate (e.g., U-shaped header track); rather, the intumescent material layer 18 is always separated apart from, and not on (contacting), the targeted substrate. Importantly, the thermal barrier layer 14 shields and protects the heat-sensitive intumescent material layer 18 from any heat that may emanate away from the underlying substrate during a fire. Thus, the foam thermal barrier layer 14 acts a barrier to heat flow.

The outer protective layer 22 (that is on the intumescent material layer 18) is preferably a resilient and flexible plastic (polyvinyl) film. The outer protective layer 22 shields and protects the underlying intumescent layer from any abrasion (such as, for example, abrasion associated with the cycling of wallboard within a wall assembly). The outer protective layer 22, may, however, be a "skin layer" that is integral to the second closed-cell polymer foam layer. In other words, the outer protective layer 22 is an optional feature.

With regards to the sealing of linear expansion joints and without necessarily prescribing to any particular scientific theory, the multi-layer fire safety tapes 10 of the present invention are believed to work substantially better than traditional intumescent caulks, sprays and tapes because the closed cells 14a (of the closed-cell polymer foam thermal barrier layer 14) act as tiny insulators that (collectively) slow/impede the flow of heat to the "heat-sensitive" intumescent material layer 18. In addition, it takes significant heat energy to absorb into and melt the thermoplastic thermal barrier layer 14 which further slows the flow of heat. Thus, the selection of the type of thermoplastic polymer and its degree of crystallinity, bubble size and density, and layer thickness all affect the rate of heat flow. Because the flow of heat to the intumescent material layer 18 is substantially slowed/impeded by the thermal barrier layer 14, it takes substantially longer for the intumescent material layer 18 to begin and finish its swell (expansion) cycle, which, in turn, lengthens the amount of time it takes for heat to be transmitted through the sealed joint system.

Figure 3:
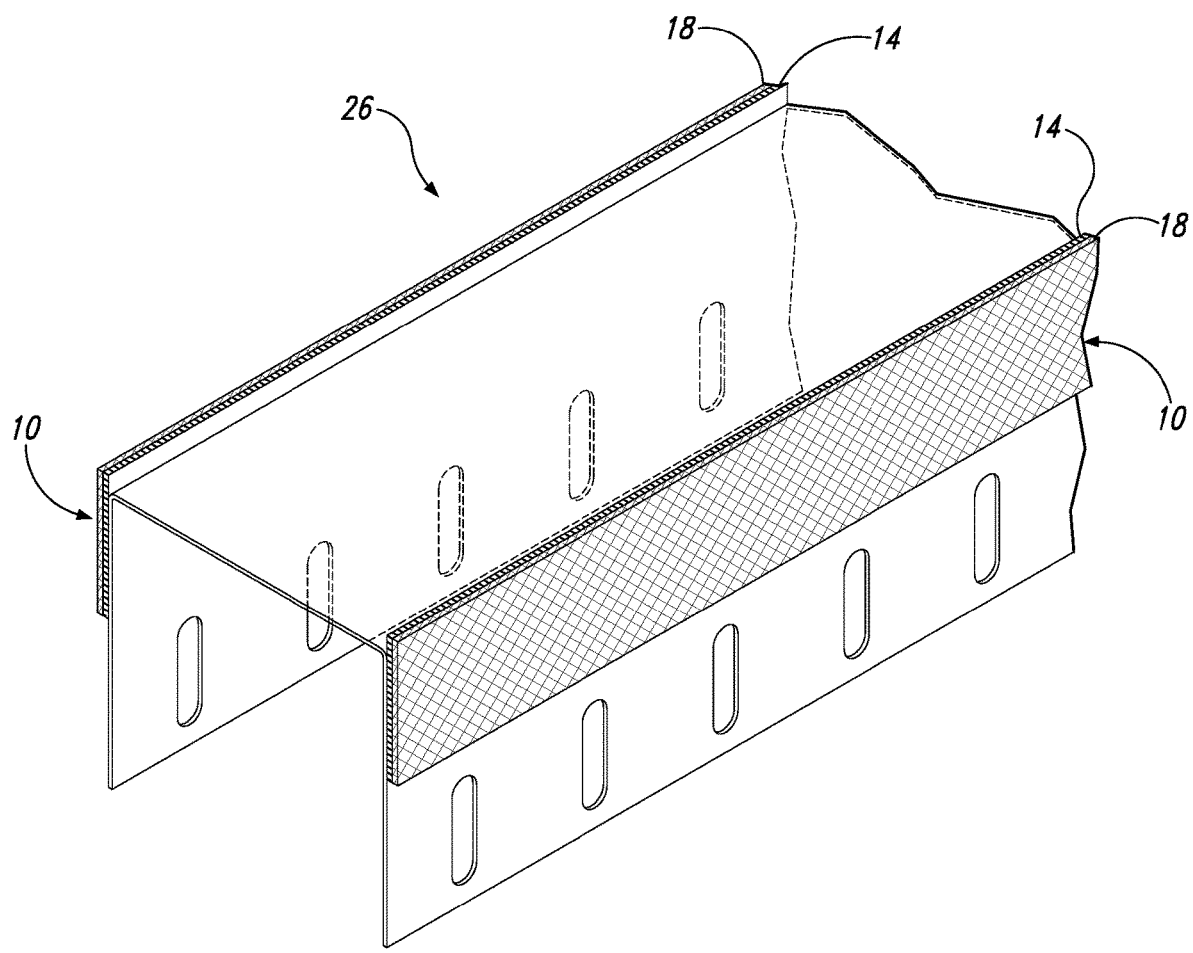
FIG. 3 is an elevated perspective view of a section of a generally U-shaped slotted header track having a multi-layer fire safety tape positioned on the upper sections of the downwardly extending flanges of the track in accordance with another embodiment of the present invention.
Figure 4:
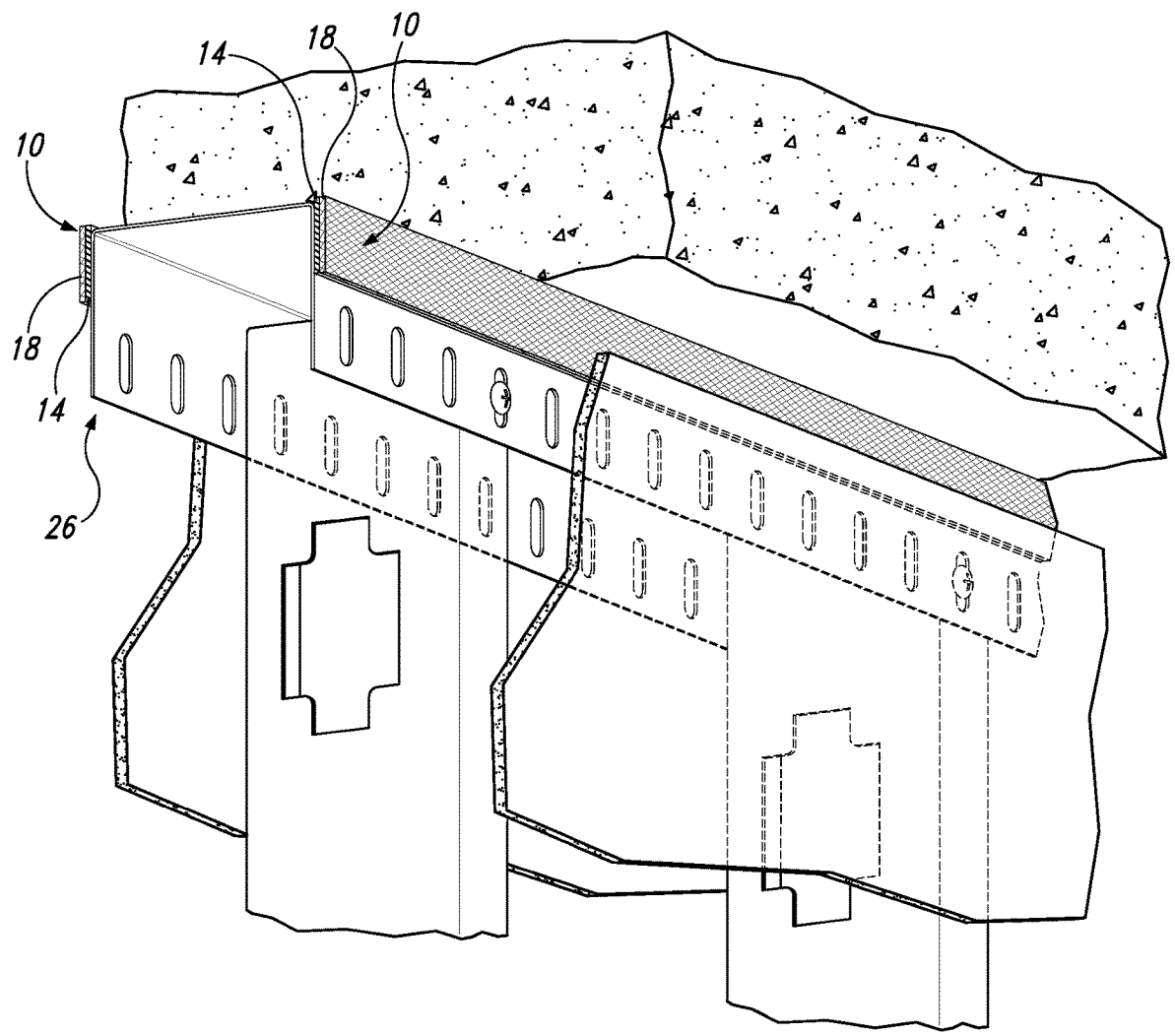
FIG. 4 is an elevated perspective view of a dynamic head-of-wall assembly that includes, as part of the wall assembly, the generally U-shaped slotted header track having a multi-layer fire safety tape positioned thereon as shown in FIG. 3.
Figure 5:
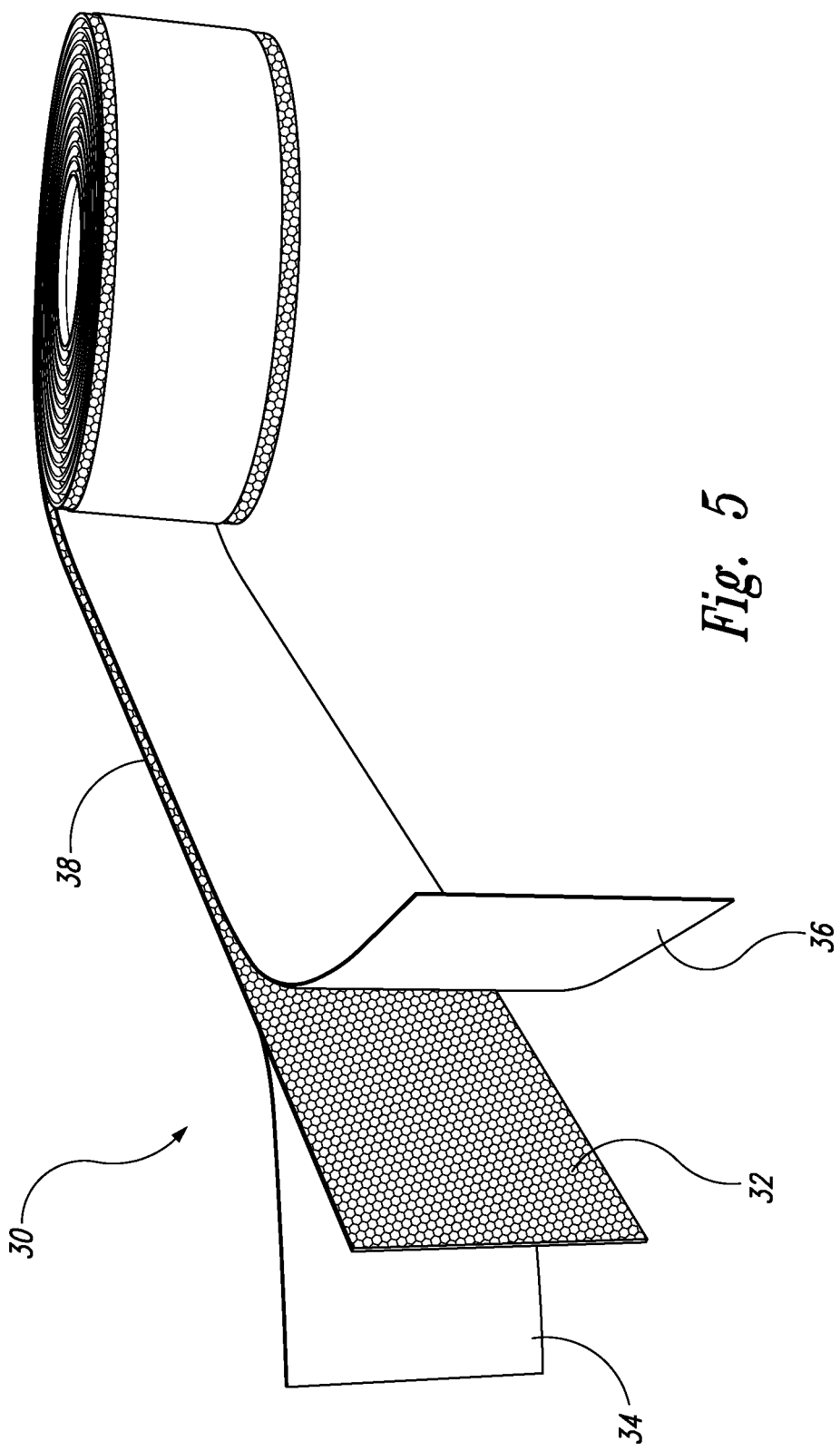
FIG. 5 is a slightly elevated perspective side end view of a more robust, multi-purpose, multi-layer building construction tape product (in the form of a partially unwound roll), wherein three layers (of the multi-layer tape product) are shown separated from oner another (to better illustrate certain features, e.g., a "Flex-Lock" edge that allows roll-over lock engagement with an adjacent sub state).

The multi-layer fire safety tapes 10 disclosed herein are particularly useful when applied to sheet metal tracks (and other framing members) used to construct wall assemblies in buildings because these composite structures and configurations of the present invention have been shown to pass UL's stringent fire tests. In these embodiments of the present invention, the flexible thermal barrier layer 14 is in physical contact with, and supported by, the track (and, thus, is considered to be "on" the track), whereas the flexible intumescent material layer 18 is positioned away from (i.e., is not "on") the track. In this configuration, one of the functions of the thermal barrier layer 14 is to slow/impede the flow of heat from the metal header track to the intumescent material layer 18 during a fire, whereas the function of the intumescent material layer 18 is to expand and seal a head-of-wall construction joint or gap. Another function of the thermal barrier layer 14 is to reduce sound transmissions between adjacent rooms within a building. In this regard, it has been unexpectedly discovered the thermal barrier layer 14 (when in the form of a closed cell foamed thermoplastic)

also substantially reduces sound transmission. It is believed the bi-layer construction of the inventive multi-layer fire safety tape 10 breaks up or otherwise disrupts the propagation of sound waves. Thus, and in still other further embodiments and as best shown in FIGS. 3 and 4, the present invention is directed to header tracks 26 (generally U-shaped sheet metal header tracks, for example, as shown in FIG. 3) and other framing members (control joint backers and L-shaped members, for example not shown) having the inventive multi-layer fire safety tape 10 applied thereto or thereon, as well as to fire rated wall assemblies that incorporate such components (as shown in FIG. 3). Such wall fire rated assemblies are more fire resistant and have work better at reducing sound transmissions.

Figure 6A:
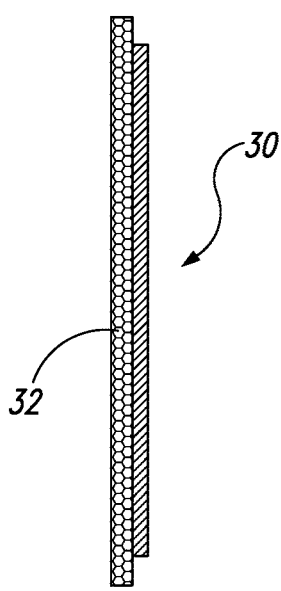
FIG. 6A is an end of the multi-layer building construction tape product shown in FIG. 5.
Figure 6B:
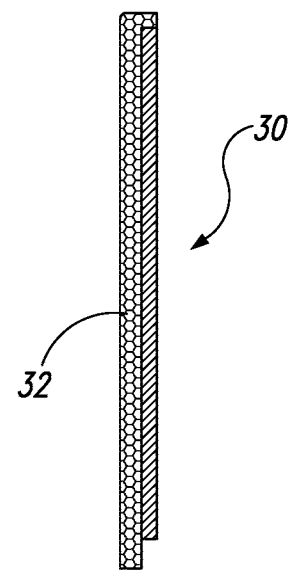
FIG. 6B is an end of the multi-layer building construction tape product shown in FIG. 5, but where an upper flex-lock edge (of a flex polymer layer) is rolled/bent over an adjacent intumescent layer (or second flex polymer layer in some embodiments).
Figure 6C:
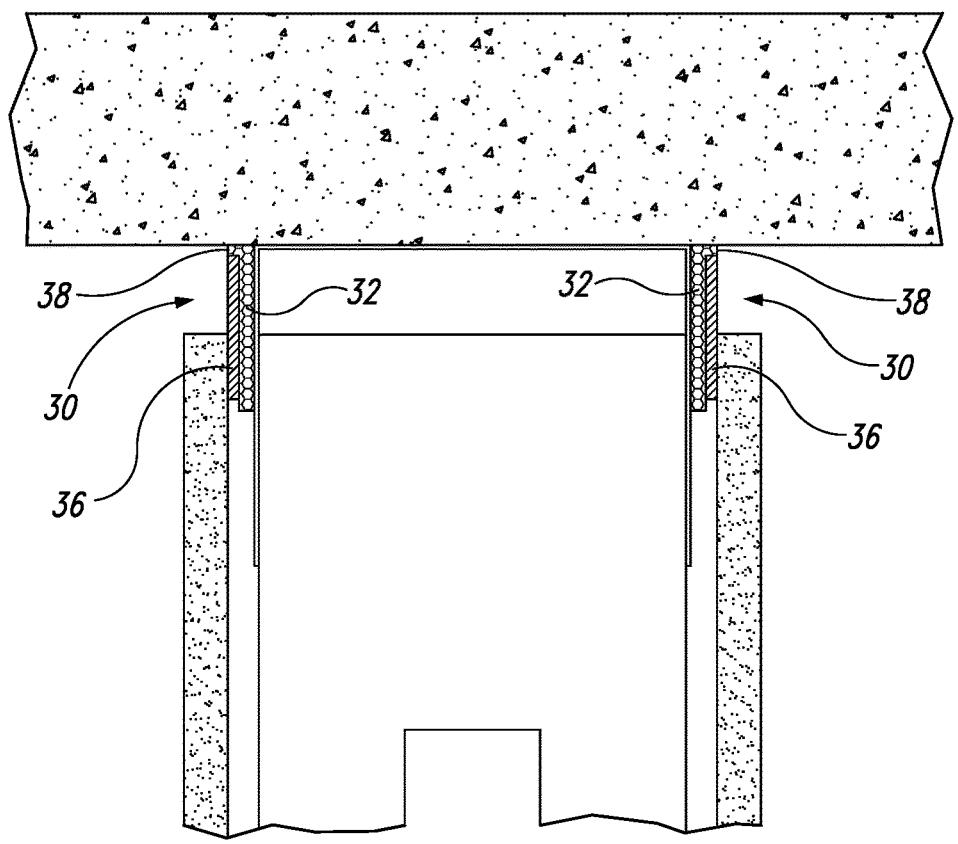
FIG. 6C is a side view of the multi-layer building construction tape product (shown in FIGS. 5 and 6A-B) adhered to a track and in combination with a wall assembly in accordance with an embodiment of the present invention.
Figure 7A:
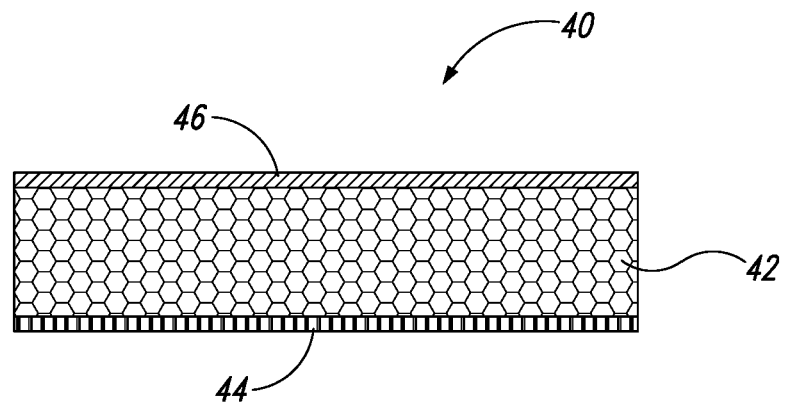
FIG. 7A is a side view of an alternative robust, multi-purpose, multi-layer building construction tape product (in the form of a strip).
Figure 7B:
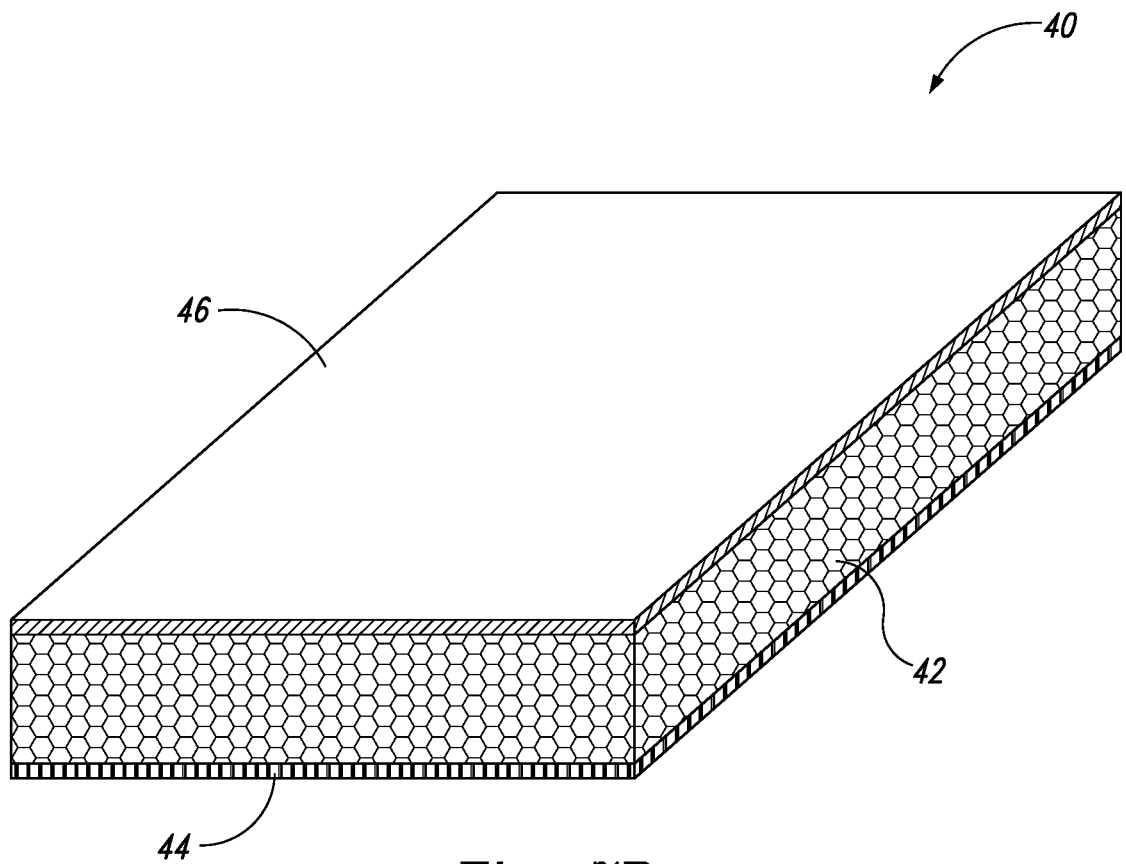
FIG. 7B is an elevated perspective view of the alternative tape product shown in FIG. 7A.
Figure 7C:
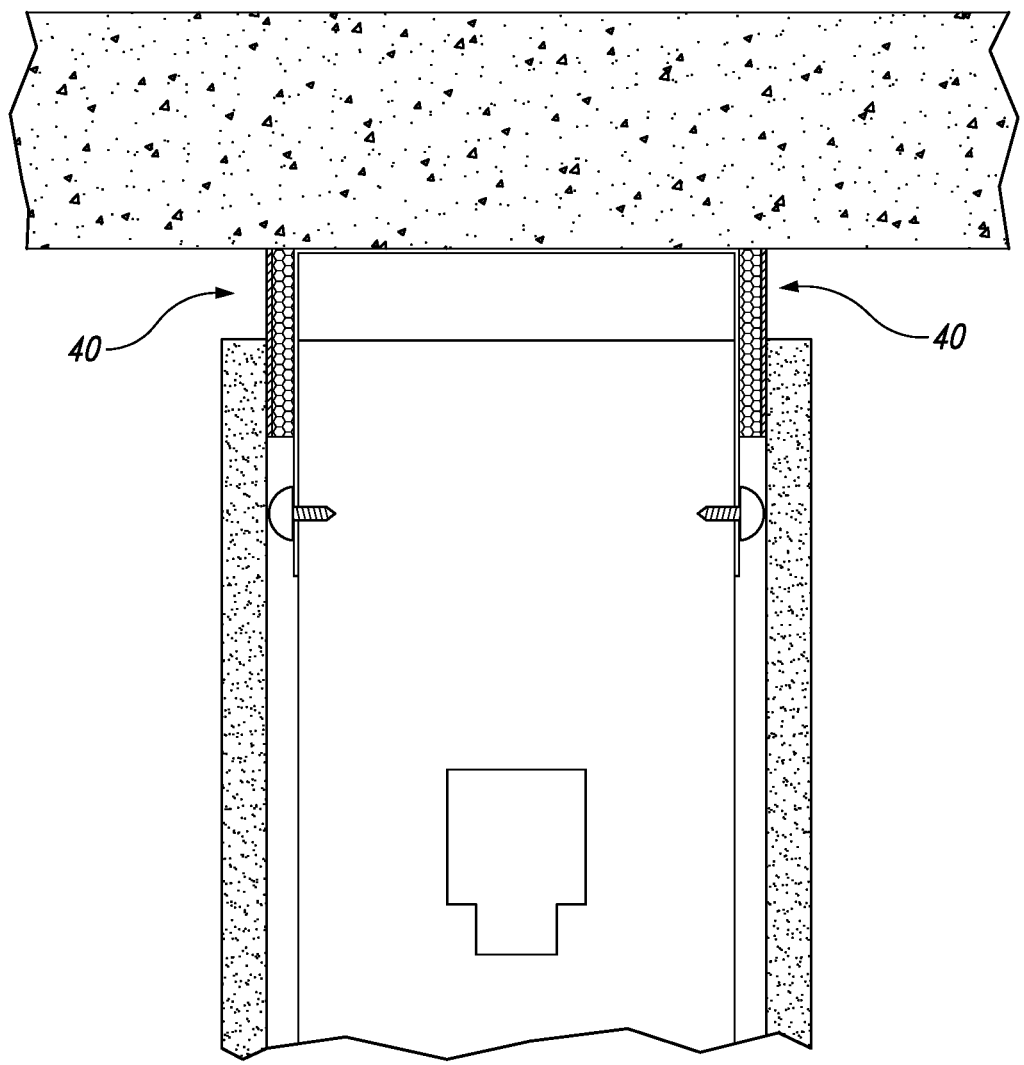
FIG. 7C is a side view of the alternative multi-layer building construction tape product (shown in FIGS. 6 and 7A-B) adhered to a track and in combination with a wall assembly in accordance with an embodiment of the present invention.

In still further embodiments, the present invention is directed to more robust multi-purpose (fire, smoke and/or sound), multi-layer, building construction tape products as shown in FIGS. 5 and 6A-C (flex-lock rollover edge firestop tape product) and FIGS. 7A-C (sound suppression tape product) and as more particularly described herein.

As shown in FIGS. 5 and 6A-C, the present invention is also directed to a multi-layer building construction tape 30 configured for use in a building construction wall, ceiling, or floor assembly, wherein the multi-layer building construction tape 30 comprises at least the following layers: a flexible thermal barrier layer 32; a peel away protective layer 34 adhered to one side of the flexible thermal barrier layer 32, and an intumescent material layer 36. As shown, the width of the peel away protective layer 34 and the flexible thermal barrier layer 32 are substantially the same and coextensive with each other along the one side. A first adhesive layer (not shown because it is so thin) is interposed between the peel away protective layer 34 and the flexible thermal barrier layer 32. As further shown, the intumescent material layer 36 is adhered to the other side of the flexible thermal barrier layer 32, wherein the thickness of the thermal barrier layer 32 and the thickness of the intumescent material layer 36 are about the same, but wherein the width of the intumescent material layer 36 is less than the width of the flexible thermal barrier layer 32 (by about ¼ inch is some embodiments and as best shown in FIG. 6A). In this configuration, the lengthwise edges of the flexible thermal barrier layer 32 may be bent over the lengthwise edges of the intumescent material layer 36 (thereby yielding, when the multi-layer building construction tape 30 is pushed up against a substrate, a flex-lock edge rollover lock 38 as best shown in FIGS. 6B-C.).

As shown in FIGS. 7A-C, the present invention in still further embodiments is also directed to a multi-layer building construction tape 40 configured for use in a building construction wall, ceiling, or floor assembly, wherein the multi-layer building construction tape 40 comprises at least the following layers: a flexible sound barrier layer 42, wherein the sound barrier layer 42 is a closed cell thermoplastic material; a peel away protective layer 44 (e.g., wax paper) adhered to one side of the flexible sound barrier layer 42, wherein the width of the peel away protective layer 42 and the flexible sound barrier layer 44 are substantially the same and coextensive with each other along the one side. A first adhesive layer (not shown because it is so thin) is interposed between the peel away protective layer 44 and the flexible thermal barrier layer 42. As further shown, a polyethylene polymer layer 46 is adhered to the other side of the flexible sound barrier layer 42. The polyethylene that comprises the polyethylene polymer layer is preferably cross-linked and unfoamed. Additionally, a second adhesive layer (not shown because it is so thin) is interposed between the flexible sound barrier layer 44 and the polyethylene polymer layer 46.

In the foregoing further and additional embodiments, the flexible thermal barrier layer 32 (shown in FIGS. 5, 6A-C, and 7A-C) may the same as the flexible thermal barrier layer 14 (shown in FIGS. 1-4). Similarly, the peel away protective layer 34 may the same as the flexible backing/release layer 12, and the intumescent material layer 18 may be the same (or different) as the intumescent material layer 36. In some embodiments, the intumescent material is completely emulsion free, the tape product is applied to both the upper and lower portions of a sidewall of a track (of a building construction assembly), and the track is secured to the studs with screws having a screw head height greater than the thickness of the tape product.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A sheet metal framing member in combination with a multi-layer fire safety tape configured for use in a fire rated wall assembly, the multi-layer fire safety tape comprising a flexible thermal barrier layer attached to a flexible intumescent material layer, wherein the intumescent material layer is composed of expandable graphite, and wherein the thermal barrier layer comprises a thermoplastic material that is on a surface of the sheet metal framing member, and wherein the thermal barrier layer is attached to the intumescent layer such that the thermal barrier layer is between the sheet metal framing member and the intumescent layer.

2. The sheet metal framing member of claim 1 wherein the intumescent layer is on the thermal barrier layer.

3. The sheet metal framing member of claim 1 wherein the thermoplastic material is a foamed thermoplastic that contains a plurality of closed cells.

4. The sheet metal framing member of claim 3 wherein the thermoplastic is a semi-crystalline polypropylene.

5. The sheet metal framing member of claim 3 wherein the flexible thermal barrier layer has a thickness ranging from about 1.0 to about 2.0 millimeters.

6. The sheet metal framing member of claim 5 wherein the flexible thermal barrier layer contains a plurality of internal cells with diameters ranging from about 100 to about 1,000 microns.

7. The sheet metal framing member of claim 6 wherein the flexible intumescent material layer has a thickness ranging from about 1.0 to about 2.5 millimeters.

8. A framing member in combination with a multi-layer building construction tape configured for use in a building construction wall, ceiling, or floor assembly, wherein the multi-layer building construction tape comprises at least the following layers:
a flexible thermal barrier layer;
a peel away protective layer adhered to one side of the flexible thermal barrier layer, wherein the width of the peel away protective layer and the flexible thermal barrier layer are substantially the same and coextensive with each other along the one side;

a first adhesive layer interposed between the peel away protective layer and the flexible thermal barrier layer; and an intumescent material layer adhered to the other side of the flexible thermal barrier layer, wherein the intumescent material layer is composed of expandable graphite, and wherein the thickness of the thermal barrier layer and the thickness of the intumescent material layer are about the same, and wherein the width of the intumescent material layer is less than the width of the flexible thermal barrier layer such that the lengthwise edges of the flexible thermal barrier layer may be bent over the lengthwise edges of the intumescent material layer.

* * * * *